(12) United States Patent
Lu et al.

(10) Patent No.: US 12,452,804 B2
(45) Date of Patent: Oct. 21, 2025

(54) METHOD FOR MAINTAINING TIME ADVANCE TIMER, BASE STATION AND TERMINAL EQUIPMENT

(71) Applicant: FUJITSU LIMITED, Kawasaki (JP)

(72) Inventors: Yanling Lu, Beijing (CN); Haibo Xu, Beijing (CN); Weiwei Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 193 days.

(21) Appl. No.: 16/526,356

(22) Filed: Jul. 30, 2019

(65) Prior Publication Data

US 2019/0357160 A1 Nov. 21, 2019

Related U.S. Application Data

(60) Division of application No. 14/057,593, filed on Oct. 18, 2013, now Pat. No. 10,420,047, which is a continuation of application No. PCT/CN2011/073105, filed on Apr. 21, 2011.

(51) Int. Cl.
*H04W 56/00* (2009.01)
*H04W 24/04* (2009.01)

(52) U.S. Cl.
CPC ......... *H04W 56/001* (2013.01); *H04W 24/04* (2013.01); *H04W 56/0045* (2013.01)

(58) Field of Classification Search
CPC ............... H04W 56/001; H04W 24/04; H04W 56/0045
See application file for complete search history.

(56) References Cited

U.S. PATENT DOCUMENTS

| 8,923,251 | B2 * | 12/2014 | Wu | H04W 74/0833 |
| | | | | 370/336 |
| 8,964,793 | B2 * | 2/2015 | Jang | H04W 56/005 |
| | | | | 455/181.1 |
| 9,155,122 | B2 | 10/2015 | Pani et al. | |
| 9,258,804 | B2 | 2/2016 | Kato et al. | |
| 2009/0204862 | A1 | 8/2009 | Chun et al. | |

(Continued)

FOREIGN PATENT DOCUMENTS

| CN | 101646234 A | 2/2010 | |
| CN | 102761954 B * | 9/2017 | ........ H04W 56/005 |

(Continued)

OTHER PUBLICATIONS

Communication pursuant to Article 94(3) EPC issued by the European Patent Office for corresponding European Patent Application No. 11 863 859.2, dated Nov. 20, 2019.

(Continued)

*Primary Examiner* — Michael J Moore, Jr.
(74) *Attorney, Agent, or Firm* — Myers Wolin, LLC (57) ABSTRACT

A base station including: a judging unit configured to judge whether a band to be uplink adjusted includes only a band corresponding to a primary cell; and a transmitter configured to transmit a command for the band corresponding to the primary cell when the judging unit determines that the band to be uplink adjusted includes only the band corresponding to the primary cell, such that a timer relating to an uplink synchronization for the band corresponding to the primary cell is restarted.

2 Claims, 5 Drawing Sheets

(56) References Cited

U.S. PATENT DOCUMENTS

| | | | |
|---|---|---|---|
| 2010/0061361 A1* | 3/2010 | Wu | H04W 56/0045 370/350 |
| 2010/0325226 A1 | 12/2010 | McBeath et al. | |
| 2011/0170420 A1 | 7/2011 | Xi et al. | |
| 2012/0008600 A1* | 1/2012 | Marinier | H04L 5/001 370/336 |
| 2012/0063425 A1 | 3/2012 | Wang et al. | |
| 2012/0082082 A1* | 4/2012 | Etemad | H04W 72/1215 370/312 |
| 2012/0182986 A1 | 7/2012 | Sebire | |
| 2012/0257513 A1* | 10/2012 | Yamada | H04W 72/21 370/328 |
| 2012/0257570 A1 | 10/2012 | Jang et al. | |
| 2013/0058315 A1 | 3/2013 | Feuersänger et al. | |
| 2013/0279486 A1 | 10/2013 | Kato et al. | |
| 2014/0029586 A1* | 1/2014 | Loehr | H04B 3/36 370/336 |
| 2014/0044050 A1* | 2/2014 | Lu | H04W 56/0045 370/328 |
| 2014/0112155 A1* | 4/2014 | Lindoff | H04W 24/04 370/242 |
| 2015/0382312 A1 | 12/2015 | Kim et al. | |
| 2016/0056944 A1 | 2/2016 | Cave et al. | |
| 2016/0081080 A1* | 3/2016 | Kato | H04W 72/0446 370/336 |
| 2020/0045659 A1 | 2/2020 | Marinier et al. | |
| 2022/0078771 A1* | 3/2022 | Jang | H04L 1/1851 |

FOREIGN PATENT DOCUMENTS

| | | | |
|---|---|---|---|
| EP | 2 230 870 A1 | 9/2010 | |
| EP | 2 015 478 A3 | 12/2010 | |
| EP | 2 701 439 A1 | 2/2014 | |
| JP | 2012-508531 A | 4/2012 | |
| JP | 2012-129922 A | 7/2012 | |
| JP | 2013-520050 A | 5/2013 | |
| JP | 2014512150 A | 5/2014 | |
| JP | 2015-130691 A | 7/2015 | |
| WO | 2010/130196 A1 | 11/2010 | |
| WO | 2010/148192 A1 | 12/2010 | |
| WO | 2010/148404 A1 | 12/2010 | |
| WO | 2011038772 A1 | 4/2011 | |

OTHER PUBLICATIONS

Hearing Notice issued on May 26, 2020 by the Patent Office of India for counterpart Indian patent application No. 3169/KOLNP/2013.
Communication pursuant to Article 94(3) EPC issued by the European Patent Office for corresponding European Patent Application No. 11863859.2, dated Sep. 14, 2020.
Office Action issued by the Canadian Intellectual Property Office for corresponding Canadian Patent Application No. 2,834,104, dated Feb. 5, 2016.
Office Action issued by the Canadian Intellectual Property Office for corresponding Canadian Patent Application No. 2,834,104, dated May 12, 2015.
Election Restriction issued by the United States Patent and Trademark Office on Jul. 11, 2016 for co-pending U.S. Appl. No. 14/057,593.
Non-final Office Action issued by the United States Patent and Trademark Office on Dec. 15, 2016 for co-pending U.S. Appl. No. 14/057,593.
Non-final Office Action issued by the United States Patent and Trademark Office on May 3, 2017 for co-pending U.S. Appl. No. 14/057,593.
Non-final Office Action issued by the United States Patent and Trademark Office on Nov. 16, 2017 for co-pending U.S. Appl. No. 14/057,593.
Final Office Action issued by the United States Patent and Trademark Office on Jun. 14, 2018 for co-pending U.S. Appl. No. 14/057,593.
Non-final Office Action issued by the United States Patent and Trademark Office on Oct. 19, 2018 for co-pending U.S. Appl. No. 14/057,593.
Notice of Allowance issued by the United States Patent and Trademark Office on May 1, 2019 for co-pending U.S. Appl. No. 14/057,593.
First Office Action for counterpart Indonesian patent application No. W00 2013 05389, issued on Mar. 18, 2019, with English concise explanation.
Examination report issued by Intellectual Property India for corresponding Indian Patent Application No. 3169/KOLNP/2013, dated Dec. 4, 2018, with English translation.
Notification of Reasons for Refusal issued by the Japan Patent Office for corresponding Japanese Patent Application No. 2017-076576, mailed on Nov. 13, 2018, with an English translation.
CATT, "TA Timer expiration in CA", Agenda Item: 7.1.8, 3GPP TSG-RAN WG2 Meeting #70, R2-102799, Montreal, Canada, May 10-14, 2010.
Notification of Reasons for Refusal issued by the Japan Patent Office for corresponding Japanese Patent Application No. 2017-076576, mailed on Jul. 3, 2018, with an English translation.
NTTDocomo, Inc., "CA support for multi-TA", Agenda Item: 7.1.1, 3GPP TSG-RAN WG2 Meeting #69, R2-101567, San Francisco, USA, Feb. 22-26, 2010.
Second Office Action issued for corresponding Japanese Patent Application No. 2015-045327, mailed on May 22, 2018, with English translation.
3GPP TS 36.331 V10.1.0, "3rd Generation Partnership Project; Technical Specification Group Radio Access Network; Evolved Universal Terrestrial Radio Access (E-UTRA); Radio Resource Control (RRC); Protocol specification (Release 12)" p. 191, Mar. 2011.
The Notification for Reexamination issued on Mar. 13, 2018 for counterpart Chinese patent application No. 201180061327.4 with an English translation.
Communication pursuant to Article 94(3) EPC issued by the European Patent Office for corresponding European Patent Application No. 11 863 859.2-1875, dated May 15, 2017.
Decision of Rejection issued by the State Intellectual Property Office of China for corresponding Chinese Patent Application No. 201180061327.4, dated Dec. 26, 2016, with an English translation.
Second Notification of Office Action issued by the State Intellectual Property Office of China for corresponding Chinese Patent Application No. 201180061327.4, dated Jul. 28, 2016, with an English translation.
Notice of Preliminary Rejection issued by the Korean Intellectual Property Office for corresponding Korean Patent Application No. 10-2016-7010100, mailed on May 9, 2016, with English translation.
Office Action issued for corresponding Japanese Patent Application No. 2015-045327 mailed on Mar. 29, 2016 with an English translation.
Notice of Final Rejection issued by the Korean Intellectual Property Office for corresponding Korean Patent Application No. 10-2013-7030550, mailed on Jan. 18, 2016, with English translation.
First Notification of Office Action issued by the State Intellectual Property Office of China for corresponding Chinese Patent Application No. 201180061327.4, dated Dec. 2, 2015, with an English translation.
Extended European search report with supplementary European search report and the European search opinion issued by the European Patent Office for corresponding European Patent Application No. 11863859.2, mailed on Oct. 23, 2015.
InterDigital Communications, "Release of PUCCH resources and removal of SCell Configuration", Agenda Item: 7.1.1.3, 3GPP TSG-RAN WG2 Meeting #71, R2-104814, Madrid, Spain, Aug. 23-27, 2010, cited in EESR mailed on Oct. 23, 2015.
Huawei et al., "the Multiple Time Advances in Carrier Aggregation", Agenda Item: 7.1, 3GPP TSG-RAN WG2 Meeting #73bis, R2-111953, Shanghai, China, Apr. 11-15, 2011, cited in EESR mailed on Oct. 23, 2015.

(56) References Cited

OTHER PUBLICATIONS

NTT Docomo, Inc., "Tat expiry and Carrier Aggregation", Agenda Item: 7.1.1.3, 3GPP TSG-RAN WG2 Meeting #71bis, R2-105825, Xi'an, China, Oct. 11-15, 2010, cited in EESR mailed on Oct. 23, 2015.
Huawei, "UE behaviour after TATexpiry", Agenda Item: 7.1.1.3, 3GPP TSG-RAN WG2 Meeting #71, R2-104846, Madrid, Spain, Aug. 23-27, 2010, cited in EESR mailed on Oct. 23, 2015.
InterDigital Communications, "TATexpiry and D-SR failure", Agenda Item: 7.1.1.3, 3GPP TSg-RAN WG2 Meeting #71bis, R2-105754, Xi'an, China, Oct. 11-15, 2010, cited in EESR mailed on Oct. 23, 2015.
Office Action issued for corresponding Mexican Patent Application No. MX/a/2013/012305 dated Apr. 24, 2015 with an English translation.
Notice of Preliminary Rejection issued by the Korean Intellectual Property Office for corresponding Korean Patent Application No. 10-2013-7030550, mailed on May 22, 2015, with English translation.
Office Action issued for corresponding Russian Patent Application No. 2013151668/07(080563) dated Feb. 18, 2015, with English translation.
Substantive examination report issued for corresponding Mexican Patent Application No. MX/a/2013/012305 dated Jan. 23, 2015, with an English summary.
Ericsson, "Impact of Carrier Aggregation on the L2 protocol architecture for LTE Rel-10", Agenda Item: 7, 3GPP TSG-RAN WG2 Meeting #66, Tdoc R2-092957, San Francisco, USA, May 4-8, 2009.
Notice of Reason for Rejection issued for corresponding Japanese Patent Application No. 2014-505481, mailed on Jan. 6, 2015, with an English translation.
Nokia Siemens Networks et al., "Multiple Timing Advance", Agenda Item: 7.1, 3GPP TSG-RAN WG2 Meeting #73bis, R2-111897, Shanghai, China, Apr. 11-15, 2011.
Intel Corporation, "Configuration of Multiple TA in Rel-11 CA", Agenda Item: 7.1, 3GPP TSG-RAN WG2 Meeting #73bis, R2-112138, Shanghai, China, Apr. 11-15, 2011.
ITRI, "Consideration of Multiple TAs in CA", Agenda Item: 7.1, 3GPP TSG-RAN WG2 Meeting #73bis, R2-112201, Shanghai, China, Apr. 11-15, 2011.
Samsung, "Scenarios and number of TA-groups to be assumed for REL11", Agenda Item: 7.1, 3GPP TSG-RAN WG2 Meeting #73bis, R2-112302, Shanghai, China, Apr. 11-15, 2011.
Partial Supplementary European Search Report issued for corresponding European Patent Application No. 11863859.2, dated Nov. 14, 2014.
ITRI, "Time Alignment Timer for different TA", Agenda Item: 7.1.1, 3GPP TSG RAN WG2 Meeting #68 bis, R2-100560, Valencia, Spain, Jan. 18-22, 2010.
Office Action issued for corresponding Korean Patent Application No. 10-2013-7030550 dated Oct. 31, 2014, with an English Translation.
International search report issued for corresponding international application No. PCT/CN2011/073105, mailed Dec. 29, 2011.
3GPP TS 36.321 V10.1.0; 3rd Generation Partnership Project; Technical Specification Group Radio Access Network; Evolved Universal Terrestrial Radio Access (E-UTRA); "Medium Access Control (MAC) protocol specification (Release 10)"; Mar. 2011.
Nokia Siemens Networks (Rapporteur); "Cell vs. Frequency"; Agenda Item: 7.1.1; 3GPP TSG-RAN WG2 Meeting #70; R2-102766; Montreal, Canada; May 10-14, 2010.
Fujitsu: "TAT expiry and CC deactivation"; Agenda Item: 7.1.1.3 (CC/cell management: CC/cell configuration); 3GPP TSG-RAN WG2 Meeting #71bis; R2-105643; Xi'an, China; Oct. 11-15, 2010.
Fujitsu: "Type 1 triggered SRS resources handling at TAT expiry and D-SR failure"; Agenda Item: 6.1.2; 3GPP TSG-RAN WG2 Meeting #73bis; R2-112097; Shanghai, China; Apr. 11-15, 2011.
Summons to attend oral proceedings pursuant to Rule 115(1) EPC issued by the European Patent Office for corresponding European Patent Application No. 11 863 859.2-1206, mailed on May 12, 2022.
Fujitsu, "Tat expiry and CC deactivation", Agenda Item: 7.1.1.3, 3GPP TSG-RN WG2 Meeting #71, R2-104322, Madrid, Spain, Aug. 23-27, 2010.
Non-final Office Action issued by the United States Patent and Trademark Office for U.S. Appl. No. 17/401,576, electronically delivered on Sep. 16, 2022.
Non-final Office Action issued by the United States Patent and Trademark Office for corresponding U.S. Appl. No. 17/401,576, electronically delivered on Dec. 28, 2023.

\* cited by examiner

METHOD FOR MAINTAINING TIME ADVANCE TIMER, BASE STATION AND TERMINAL EQUIPMENT

CROSS REFERENCE TO RELATED APPLICATIONS

This application is a Divisional Application of U.S. application Ser. No. 14/057,593 filed on Oct. 18, 2013 which is a continuation of International Application PCT/CN2011/073105, filed on Apr. 21, 2011 and designating the U.S., the entire contents of which are incorporated herein by reference.

TECHNICAL FIELD

The present invention relates to the field of communications and, in particular to a method for maintaining a time advance timer, a base station and terminal equipment.

BACKGROUND ART

Figure 1:
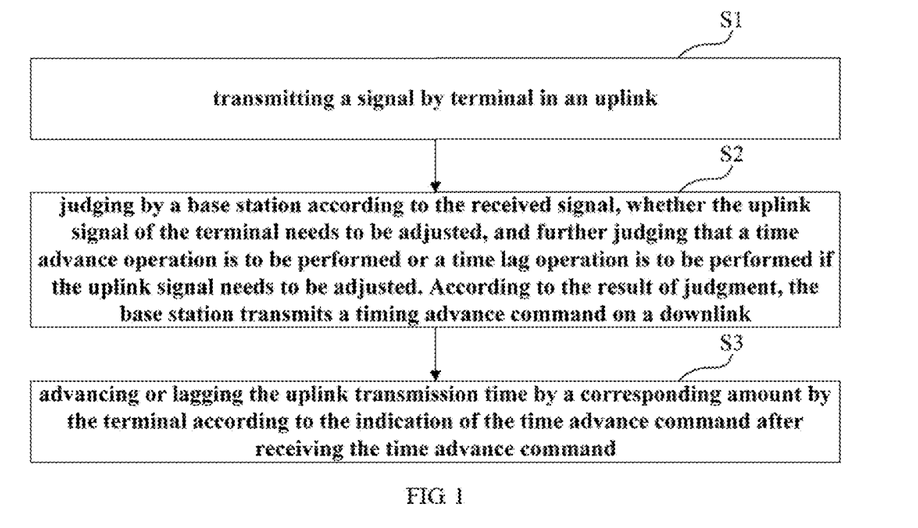
FIG. 1 is a flowchart of uplink synchronization processing by a base station and terminal equipment.

In an LTE-A (long-term evolution-advanced) system of Rel. 10, in order to realize uplink communications, the synchronization of the uplink must be ensured. The process of realizing the synchronization of the uplink is as shown in FIG. 1, and comprises the steps of:

S1: transmitting a signal by a terminal in an uplink, the signal being an uplink random access preamble signal transmitted by the terminal in a random access procedure, or a data signal;

S2: judging by a base station according to the received signal, whether the uplink signal of the terminal needs to be adjusted, and further judging that a time advance operation is to be performed or a time lag operation is to be performed if the uplink signal needs to be adjusted. According to the result of judgment, the base station transmits a timing advance command on a downlink. In the time advance command, the base station notifies the terminal of the amount of time needed advance or lag. According to the type of the signal (a data signal or a random access preamble signal) transmitted by the terminal on the uplink, the time advance command transmitted by the base station is contained in different downlink messages. If a random access preamble signal is transmitted by the terminal in the uplink, the time advance command is contained in a random access response message. And if a data signal is transmitted by the terminal in the uplink, the time advance command is embodied as a control information element of a medium access control (MAC) layer.

S3: advancing or lagging the uplink transmission time by a corresponding amount by the terminal according to the indication of the time advance command after receiving the time advance command. And at the same time, a time advance timer needs to be maintained at the terminal. If the time advance timer is in operation, the terminal thinks that its uplink is in a synchronization state. And if the time advance timer expires, the terminal thinks that its uplink is out of synchronization, and needs to flush all the hybrid automatic repeat request (HARM) buffer, notify a radio resource control (RRC) layer to release a physical uplink control channel (PUCCH) and a sounding reference signal (SRS), and flush any configured downlink assignment and uplink grant. After the uplink is out of synchronization and if there is a need to transmit new uplink or downlink data, the terminal must execute a random access procedure, so as to obtain uplink synchronization again and restart the time advance timer.

Currently, there are several cases for the start of a time advance timer: a terminal starts or restarts the time advance timer when receiving an MAC element of a time advance command; starts or restarts the time advance timer when the time advance command is contained in a random access response message and if a random access preamble is not selected by an MAC layer of the terminal; starts the time advance timer when the time advance command is contained in a random access response message and a random access preamble is selected by an MAC layer of the terminal and if the time advance timer is not in operation, and stops the time advance timer when the contention in the random access procedure is not solved; and neglects the received time advance command in other cases where a time advance command is contained in a random access response message.

In a single-band system, for uplink carriers in the same band transmitted from the same terminal, when the positions of their receiving ends are identical, their synchronization states may be deemed as being consistent; that is, if an uplink of one carrier is synchronized by being adjusted, the uplinks of other carriers in the same band may also be synchronized only if the other carriers are adjusted in the same manner as that of the one carrier; therefore, in such a single-band system, uplink measurement may only be performed on one of the uplinks, and the other carriers are adjusted using the same measures according to the measurement result. In this way, the uplink synchronization of the whole band may be maintained, thereby only one time advance timer needing to be maintained at the terminal.

However, in a multi-band carrier aggregation system, relatively large differences exist in uplink transmission between different bands, and hence, there will exit difference in uplink synchronization adjustment for carriers of different bands. In such a case, different amounts of time adjustment need to be transmitted for the carriers of different bands, and it is possible that multiple time advance commands for multiple bands are transmitted simultaneously. And at the same time, multiple time advance timers may be maintained for multiple bands at the terminal, and also, one time advance timer may only be maintained.

Therefore, for a multi-band carrier aggregation system, how to maintain the one or more time advance timer(s) by a base station or a terminal has become a problem urgent to be solved.

Figure 2:
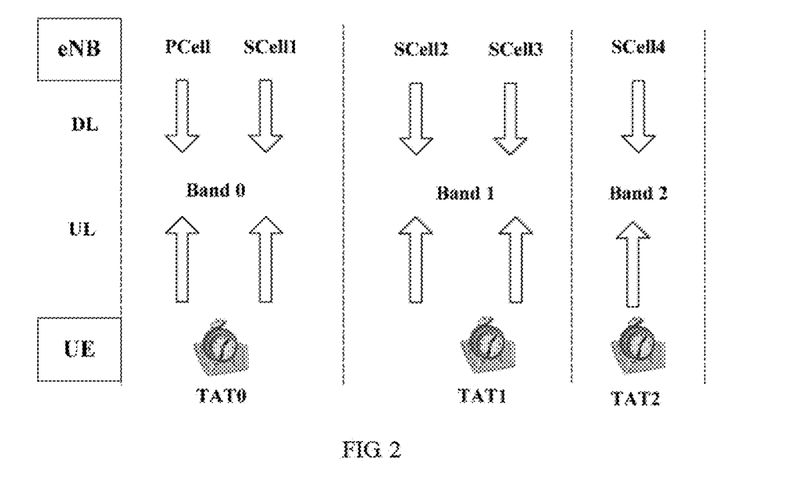
FIG. 2 is a schematic diagram of multiple TATs in a multi-band carrier aggregation system.

FIG. 2 is a schematic diagram of multiple time advance timers (TATs) in a multi-band carrier aggregation system. As shown in FIG. 2, in the multi-band carrier aggregation system of this embodiment, a base station assigning three bands for a terminal is taken as an example, wherein, a primary cell (PCell) and a secondary cell (SCell) 1 are at a band 0, secondary cells 2 and 3 are at a band 1, and secondary cell 4 is at a band 2. In this embodiment, the terminal corresponding to the three bands via three different TATs is taken as an example.

As shown in FIG. 2, if the three TATs are maintained completely independently, when TAT0 is in operation and TAT1 expires, according to the uplink maintaining process, the terminal needs to flush the HARQ buffer in band 1 and release the dedicated resources to which the carriers in band 1 in the PUCCH correspond and the SRSs to which the carriers in band 1 correspond. Such operations relate only to the communications of the local band, and have no effect on the communications of other bands. Likewise, when TAT2 expires, the operations of the terminal have effect only on the communications of band 2. However, when TAT0 expires and TAT1 and TAT2 are in operation, the terminal judges that the uplink of the PCell is out of synchronization, and as PUCCHs are transmitted only in the uplink of the PCell, at this moment, due to the PUCCHs cannot be transmitted in the uplink, the communications of the whole terminal are affected, and cannot perform communications efficiently. In such a case, out-of-synchronization of one band leads to interruption of the communications of the whole terminal.

The case where TAT 0 is in operation and TAT1 or TAT2 expires may be deemed as a normal situation, as in some cases, the base station may determine according to judgment of a traffic amount that some terminals do not need so many bands, and intentionally make uplinks of some bands be out of synchronization, so as to release resources for other terminals. However, the case where TAT1 and TAT2 are in operation and TAT0 expires should be avoided.

Figure 3:
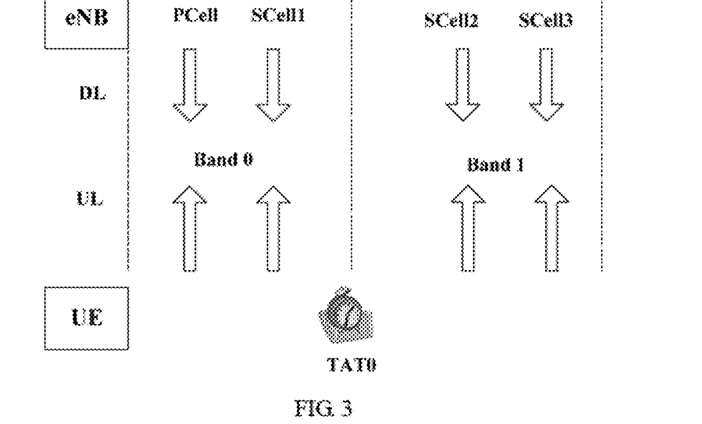
FIG. 3 is a schematic diagram of a single TAT in a multi-band carrier aggregation system.

FIG. 3 is a schematic diagram of a single TAT in a multi-band carrier aggregation system. As shown in FIG. 3, in the multi-band carrier aggregation system of this embodiment, there is only one TAT at the terminal. In such a scenario, if the TAT is made to be reset by the time advance command to which a certain band corresponds, the terminal cannot learn the uplink synchronization situation of all the bands. For example, if the time advance command to which band 0 corresponds can only reset the TAT, the terminal will not learn whether band 1 is in synchronization. If the TAT is made to be reset by the time advance command to which any band corresponds, following situation is possible to occur: in the time period set in the timer, multiple time advance commands are received at a certain band, and at the same time, no time advance command is received at certain another band, while the timer is still in operation. Based on the TAT principle, in the time period set in the timer, the base station should be able to reasonably set the numerical values in a time advance command and transmission timing according to the uplink synchronization situation, and keeps the timer in operation. And if the terminal receives no time advance command in the set time period, it is deemed as out-of-synchronization of uplink. In such a case, the uplink state obtained by the terminal from the TAT is wrong. For example, the numerical value set by TAT0 in FIG. 3 is 500 ms. Within 500 ms, the terminal receives twice the time advance command corresponding to band 1, while receiving no time advance command corresponding to band 0. At this moment, the TAT is in operation, but the uplink of band 0 is actually possible to be out of synchronization.

A document advantageous to the understanding of the present invention and the conventional technologies is listed below, which is incorporated herein by reference, as it is fully described herein.

[Non-patent document 1]: 3GPP TS 36.321 C10.1.0 (2011-3) Medium Access Control (MAC) protocol specification.

It should be noted that the above description of the background art is merely provided for flush and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of the present invention is to provide a method for maintaining a time advance timer, a base station and terminal equipment. By processing time advance timers by the base station or the terminal equipment, the time advance timer to which the band where the PCell is located corresponds expires at last, thereby preventing interruption of communications of the terminal due to advanced expiration of the time advance timer to which the band where the PCell is located corresponds.

According to an aspect of the embodiments of the present invention, there is provided a method for maintaining a TAT, the method being applicable to a base station, wherein the method comprises:

judging whether a band to be uplink adjusted includes only the band where a primary cell is located; and transmitting a time advance command to the band where the primary cell is located if the band where the primary cell is located is only included, such that the time advance timer to which the band where the primary cell is located corresponds is restarted.

According to another aspect of the embodiments of the present invention, there is provided a base station, wherein the base station comprises:

a judging unit configured to judge whether a band to be uplink adjusted includes only the band where a primary cell is located; and a first transmitting unit configured to transmit a time advance command to the band where the primary cell is located when the band to be uplink adjusted includes only the band where the primary cell is located, such that the time advance timer to which the band where the primary cell is located corresponds is restarted.

According to still another aspect of the embodiments of the present invention, there is provided a method for maintaining a time advance timer, the method being applicable to a terminal, wherein the method comprises:

judging whether an expired TAT is a TAT to which a band where a primary cell is located corresponds; and flushing all the hybrid automatic repeat request buffer in the band to which the expired TAT corresponds and releasing the specific resources in a PUCCH and SRSs if the expired TAT is not a TAT to which a band where a primary cell is located corresponds, the specific resources corresponding to the carriers in the band to which the expired TAT corresponds, and the SRSs corresponding to the carriers in the band to which the expired TAT corresponds.

According to further still another aspect of the embodiments of the present invention, there is provided terminal equipment, wherein the terminal equipment comprises:

a first judging unit configured to judge whether an expired TAT is a TAT to which a band where a primary cell is located corresponds; and a first processing unit configured to flush all the hybrid automatic repeat request buffer in the band to which the expired TAT corresponds and releasing the specific resources in a PUCCH and SRSs when the result of judgment of the first judging unit is that the expired TAT is not a TAT to which a band where a primary cell is located corresponds, the specific resources corresponding to the carriers in the band to which the expired TAT corresponds, and the SRSs corresponding to the carriers in the band to which the expired TAT corresponds.

According to further still another aspect of the embodiments of the present invention, there is provided a computer-readable program, wherein when the program is executed in a base station, the program enables the computer to carry out the method for maintaining a time advance timer applicable to a base station as described above in the base station.

According to further still another aspect of the embodiments of the present invention, there is provided a storage medium in which a computer-readable program is stored, wherein the computer-readable program enables the computer to carry out the method for maintaining a time advance timer applicable to a base station as described above in the base station.

According to further still another aspect of the embodiments of the present invention, there is provided a computer-readable program, wherein when the program is executed in terminal equipment, the program enables the computer to carry out the method for maintaining a time advance timer applicable to terminal equipment as described above in the terminal equipment.

According to further still another aspect of the embodiments of the present invention, there is provided a storage medium in which a computer-readable program is stored, wherein the computer-readable program enables the computer to carry out the method for maintaining a time advance timer applicable to terminal equipment as described above in the terminal equipment.

The advantages of the embodiments of the present invention exist in that by processing time advance timers by the base station or the terminal, the time advance timer to which the band where the PCell is located corresponds expires at last, thereby preventing interruption of communications of the terminal due to advanced expiration of the time advance timer to which the band where the PCell is located corresponds.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be enlarged or reduced. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment. In the drawings.

DETAILED DESCRIPTION OF THE INVENTION

The foregoing and other features of the embodiments of the present invention will become apparent with reference to the drawings and the following description. These embodiments are illustrative only and are not intended to limit the present invention. For easy understanding of the principle and embodiments of the present invention by those skilled in the art, the embodiments of the present invention shall be described taking a method for maintaining a time advance timer in a multi-band carrier aggregation system as an example. However, it should be understood that the embodiments of the present invention are not limited to such a system, and are applicable to other systems related to multiple bands.

Embodiment 1

Figure 4:
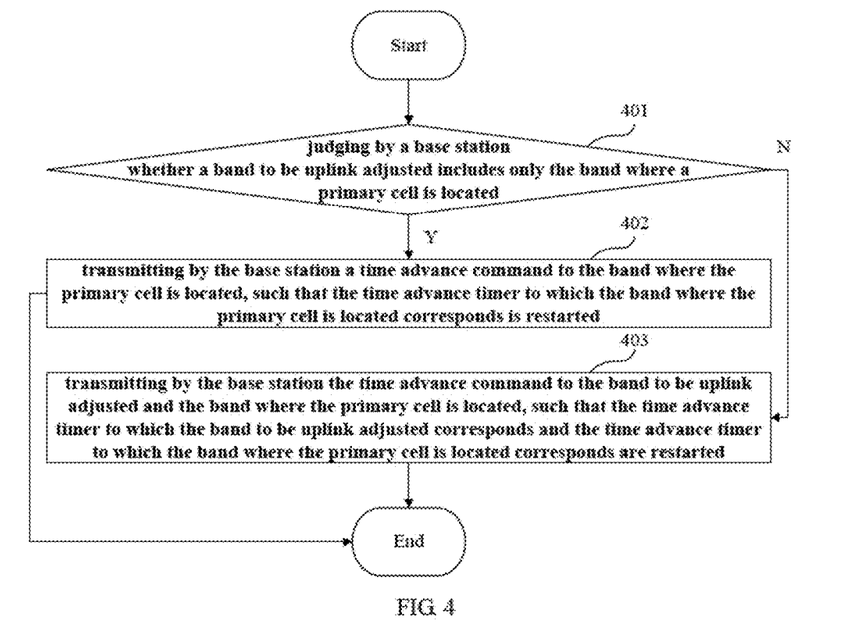
FIG. 4 is a flowchart of the method for maintaining a time advance timer of Embodiment 1 of the present invention.

FIG. 4 is a flowchart of the method for maintaining a time advance timer of Embodiment 1 of the present invention. As shown in FIG. 4, the method comprises:

step 401: judging by a base station whether a band to be uplink adjusted includes only the band where a primary cell is located; and step 402: transmitting by the base station a time advance command to the band where the primary cell is located if the result of judgment of the base station is that the band where the primary cell is located is only included, such that the time advance timer to which the band where the primary cell is located corresponds is restarted.

In this embodiment, if the result of judgment of the base station is that the band to be uplink adjusted includes a band where the primary cell is not located, the base station may execute the following step:

step 403: transmitting by the base station the time advance command to the band to be uplink adjusted and the band where the primary cell is located, such that the time advance timer to which the band to be uplink adjusted corresponds and the time advance timer to which the band where the primary cell is located corresponds are restarted.

In this embodiment, in transmitting a time adjustment command, the base station may indicate a signaling format of a band needing to be adjusted in an implied manner, or may indicate a signaling format of a band needing to be adjusted in an explicit manner, or both, according to different mechanisms for transmitting the time adjustment command. Examples are given as follows.

In transmitting a corresponding time adjustment command in a carrier in the band needing to be adjusted, as the band needing to be adjusted is the band carrying the time adjustment command, the identification information of this band may be impliedly expressed. In such a case, the time adjustment command may not carry the identification information of the band, and may use the format in Rel. 10, as shown in FIG. 5.

When a time adjustment command to which a certain band corresponds is transmitted in other bands, band identification information, such as band index, needs to be carried in the time adjustment command. In this way, a signaling format explicitly indicating a band index may be employed, such as the format shown in FIG. 6. In such a case, the index of the band needing to be adjusted needs to be explicitly indicated in the signaling.

Figure 5:
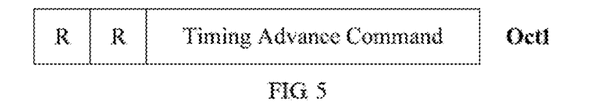
FIG. 5 is a schematic diagram of impliedly expressing a time adjustment command format of band ID.
Figure 6:
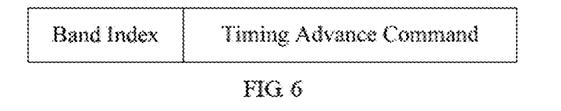
FIG. 6 is a schematic diagram of explicitly expressing a time adjustment command format of band ID.

In this embodiment, the signaling formats shown in FIGS. 5 and 6 may be used by the time advance command simultaneously or respectively. A particular format depends on whether the band for transmitting the time advance command and the band to which the command corresponds are the same band, as described above.

In this embodiment, as it is necessary that the time adjustment command of the band where the PCell is located is transmitted, the time adjustment command of the band where the PCell is located may use a format of time adjustment command impliedly expressing band ID. If the time adjustment command adjusting the band where the PCell is located is not transmitted in the carrier of the band where the PCell is located, a format of time adjustment command explicitly expressing band ID is used for the time adjustment commands to which other bands correspond, no matter whether the time adjustment commands are transmitted in the carriers of the bands to which they correspond.

Figure 7:
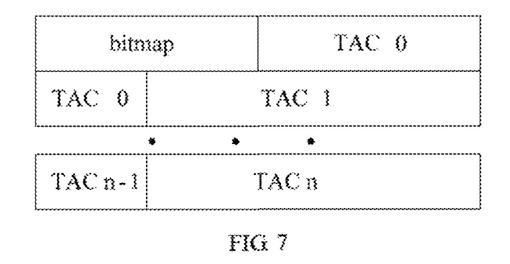
FIG. 7 is a schematic diagram of expressing an aggregation time advance command of band ID with a bitmap.

Furthermore, as in an actual process of signaling transmission, each time adjustment command needs to be transmitted together with a sub-head of an MAC layer at the same time, such a sub-head is mainly used to indicate the categories of the commands (in an MAC layer, besides the time adjustment commands, there are many other commands), so that the terminal interpret the meanings of each bit in different commands (i.e. contents of the commands) according to the categories of the commands. This sub-head is of a length of a byte, and when a plurality of time adjustment commands are transmitted in one carrier, a plurality of sub-heads will occur and resources will be wasted. Therefore, a format in which a plurality of time adjustment commands are aggregated to share a sub-head may be employed. In this embodiment, following selections are provided:

1) the band ID is expressed with a bitmap, as shown in FIG. 7, wherein, each bit corresponds to a band; when a bit value is 1, it indicates that a time adjustment command corresponding to the band is contained in the message; and when a bit value is 0, it indicates that a time adjustment command corresponding to the band is not contained in the message. After the bitmap, the time adjustment commands corresponding to the bits of a value 1 are arranged in an order in the bitmap. As it is necessary that the time adjustment command of the band where the PCell is located is transmitted, there is no bit corresponding to the band where the PCell is located in the bitmap, and the time adjustment command corresponding to it may be placed at a position immediately following the bitmap. In this way, in the bitmap, the time adjustment commands of the band corresponding to the bits of a value 1 immediately follow the time adjustment command of the band where the PCell is located.

Figure 8:
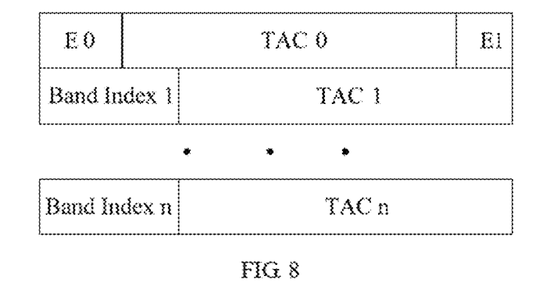
FIG. 8 is a schematic diagram of explicitly expressing an aggregation time advance command of band ID.

2) the band ID is expressed in an explicit manner; however, as it is necessary that the time adjustment command of the band where the PCell is located is transmitted, the ID of the band where the PCell is located may be omitted, as shown in FIG. 8. Referring to FIG. 8, the time advance command TAC 0 of the band where the PCell is located is frontmost and has an expansion bit E0 at the same time, which indicates whether there are subsequent time advance commands to which other bands correspond. For bands having only SCells, the band ID needs to be specified (such as band index 1), and at the same time, an expansion bit (such as E1) is needed to indicate whether there are subsequent time advance commands of other bands. If the number of the time advance commands in such aggregated time advance commands has reached a maximum value in a certain rule, for example, a certain terminal may aggregate at most k bands only, the last time advance command TAC k need no expansion bit.

In an implementation of this embodiment, all the bands may correspond to one time advance timer, that is, the terminal maintains one time advance timer. In another implementation of this embodiment, each band corresponds to one time advance timer, that is, the terminal maintains a plurality of time advance timers, each time advance timer corresponding to one band.

In this embodiment, when the terminal maintains a plurality of time advance timers, each time advance timer may correspond to all the carriers in one band, and may correspond to a part of the carriers in one band, and this embodiment is not limited thereto.

In this embodiment, "band" is a logic concept, and all the carriers may be deemed as being in the same band only if the transmission characteristics of them are identical or the difference between the transmission characteristics of them is less than a certain threshold. That is, each of the bands in this embodiment corresponds to a plurality of carriers, the transmission characteristics of the carriers being identical or the difference between the transmission characteristics of the carriers being less than a predefined threshold.

According to the method of this embodiment, in discovering that any band where the PCell is not located needs to be uplink adjusted, the base station transmits a time advance command to the band where the PCell is not located and a band where the PCell is located. And in discovering that only the band where the PCell is located needs to be uplink adjusted, the base station transmits a time advance command to the band where the PCell is located only. With the method of this embodiment, if the terminal has TATs corresponding to each of the bands, the TAT corresponding to a respective band is reset in receiving a time advance command; and if the terminal has only one TAT, the only TAT is reset in receiving a time advance command. Therefore, the TAT to which the band where the PCell is located corresponds is ensured to expire at the last, thereby solving the problem when there are a plurality of TATs. But, when the terminal has only one TAT, the problem shown in FIG. 3 that the time advance command to which any band corresponds enables the TAT to be reset will occur. However, as the uplink state of the band where the PCell is located has been well reflected by the TAT, the problem that the uplink of the band where the PCell is located is out of synchronization while the TAT is in operation will not occur. In such a case, if the base station deems that the terminal does not need a certain band having only SCells any longer, it may make the terminal release the resources of the band by deconfiguring the band from the terminal.

An embodiment of the present invention further provides a base station, as described in Embodiment 2 below. As the principle of the base station for solving problems is similar to that of the method for maintaining a time advance timer based on a base station of Embodiment 1, the implementation of the method may be referred to for the implementation of the base station, and the repeated parts shall not be described any further.

Embodiment 2

Figure 9:
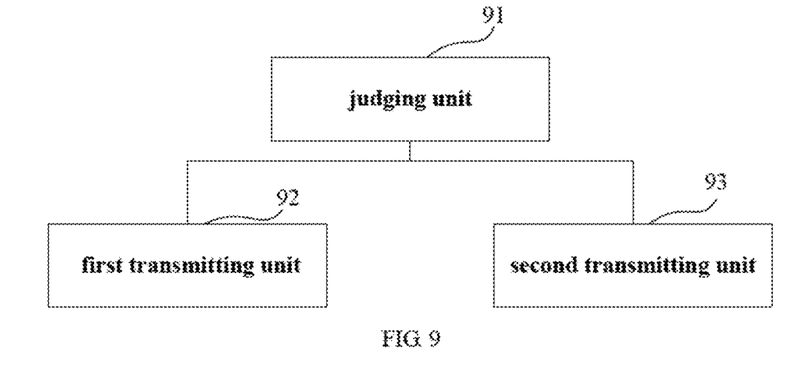
FIG. 9 is a schematic diagram of the composition of the base station of Embodiment 2 of the present invention.

FIG. 9 is a schematic diagram of the composition of the base station of Embodiment 2 of the present invention. As shown in FIG. 9, the base station comprises: a judging unit 91 and a first transmitting unit 92; wherein, the judging unit 91 is configured to judge whether a band to be uplink adjusted includes only the band where a primary cell is located; and the first transmitting unit 92 is configured to transmit a time advance command to the band where the primary cell is located when the result of judgment of the judging unit 91 is that the band to be uplink adjusted includes only the band where the primary cell is located, such that the time advance timer corresponding to the band where the primary cell is located is restarted.

In this embodiment, the base station may further comprise:

a second transmitting unit 93 configured to transmit a time advance command to the band to be uplink adjusted and the band where the primary cell is located when the result of judgment of the judging unit 91 is that the band to be uplink adjusted includes a band where the primary cell is not located, such that the time advance timer corresponding to the band to be uplink adjusted and the time advance timer corresponding to the band where the primary cell is located are restarted.

The base station of this embodiment determines the transmission of a time advance command by judging whether a band to be uplink adjusted includes only the band where a primary cell is located by the judging unit 91, so as to ensure that a time advance command is transmitted at least to the band where the primary cell is located. Therefore, the uplink state of the band where the PCell is located can be well reflected by the TAT, no matter whether one time advance timer is maintained or a plurality of time advance timers are maintained at the terminal, without leading to interruption of communications due to advanced expiration of the time advance timer to which the band where the PCell is located corresponds.

Embodiment 3

Figure 10:
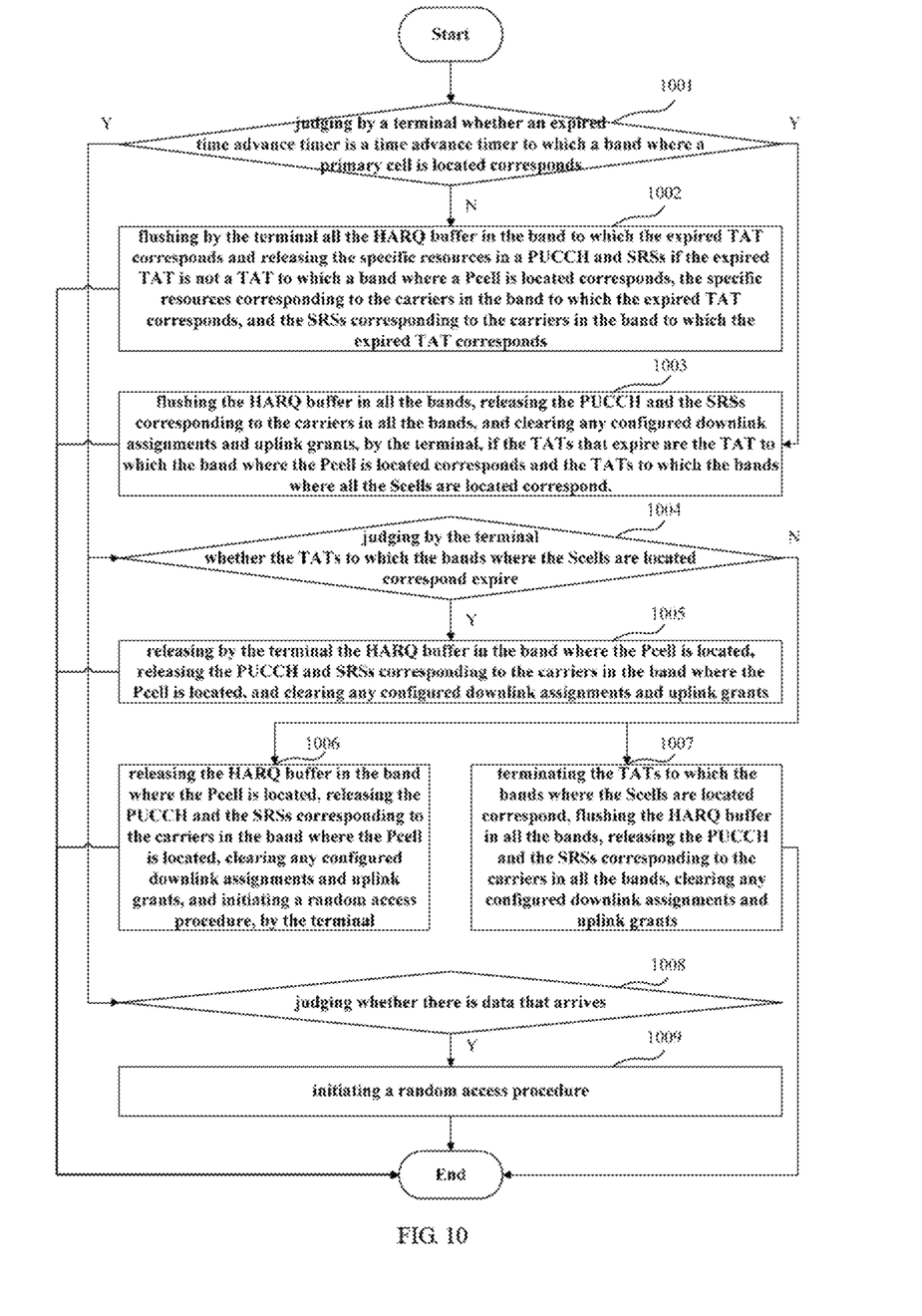
FIG. 10 is a flowchart of the method for maintaining a time advance timer of Embodiment 3 of the present invention.

FIG. 10 is a flowchart of the method for maintaining a time advance timer of Embodiment 3 of the present invention. As shown in FIG. 10, the method comprises:

step 1001: judging by a terminal whether an expired time advance timer is a time advance timer to which a band where a primary cell is located corresponds; and step 1002: flushing by the terminal all the hybrid automatic repeat request buffer in the band to which the expired time advance timer corresponds and releasing the specific resources in a physical uplink control channel and sounding reference signals if the expired time advance timer is not a time advance timer to which a band where a primary cell is located corresponds, the specific resources corresponding to the carriers in the band to which the expired time advance timer corresponds, and the sounding reference signals corresponding to the carriers in the band to which the expired time advance timer corresponds.

In the implementation of this embodiment, if the terminal judges that the TAT to which the band where the PCell is located corresponds does not expire, it deems that this is a normal operation, flushes the HARQ buffer in this band only, and releases the specific resources to which the carriers in this band correspond and the SRSs to which the carriers in this band correspond in the PUCCH. Still taking the case shown in FIG. 2 as an example, TAT0 is the TAT to which the band where the PCell is located corresponds, and TAT1 and TAT2 are TATs to which the bands where the SCells are located correspond. In some cases, the base station may determine according to judgment of a traffic amount that some terminals do not need so many bands, and intentionally make uplinks of some bands be out of synchronization, so as to release resources for other terminals. Therefore, a case occurs where TAT0 is in operation while TAT1 or TAT2 expires. Thus, it can be seen that this is a normal situation.

In this implementation, as the TAT that expires is not the TAT to which the band where the PCell is located corresponds, the problem of interruption of communication links due to flushing or releasing corresponding resources as a result of advanced expiration of the TAT to which the band where the PCell is located corresponds will not occur.

In another implementation of this embodiment, if the result of judgment of the terminal is that the TATs that expire are the TAT to which the band where the PCell is located corresponds and the TATs to which the bands where all the SCells are located correspond, the terminal may execute the following step:

step 1003: flushing the HARQ buffer in all the bands, releasing the PUCCH and the SRSs corresponding to the carriers in all the bands, and clearing any configured downlink assignments and uplink grants.

In this implementation, if the terminal judges that the TAT to which the band where the PCell is located corresponds and the TATs to which the bands where all the other SCells are located correspond expire at the same time, it flushes the HARQ buffer in all the bands, releases the PUCCH and the SRSs corresponding to the carriers in all the bands, and clears any configured downlink assignments and uplink grants. Therefore, when the timer to which the band where the PCell is located corresponds expires and the timer to which the bands where all the SCells are located correspond expire at the same time, a flushing or releasing operation shall be performed to the corresponding resources of the bands where the SCells are located while flushing or releasing the corresponding resources of the band where the PCell is located. Therefor, the problem of interruption of communication links due to flushing or releasing corresponding resources as a result of advanced expiration of the TAT to which the band where the PCell is located corresponds will not occur.

In another implementation of this embodiment, if the result of judgment of the terminal is that the TAT that expires is the TAT to which the band where the PCell is located corresponds, the terminal may further execute the following steps:

step 1004: judging by the terminal whether the TATs to which the bands where the SCells are located correspond expire; and step 1005: releasing by the terminal the HARQ buffer in the band where the PCell is located, releasing the PUCCH and SRSs corresponding to the carriers in the band where the primary cell is located, and clearing any configured downlink assignments and uplink grants, if all the TATs to which the bands where all the SCells are located correspond expire before.

In this implementation, if the terminal judges that the TAT to which the band where the PCell is located corresponds expires and the TATs to which the bands where all the non-PCells are located correspond have expired before, the HARQ buffer in the band where the PCell is located corresponds is released, the PUCCH and the SRSs corresponding to the carriers in the band where the PCell is located corresponds are released, and any configured downlink assignments and uplink grants are cleared. As the TATs to which the bands where the SCells are located correspond have expired when the TAT to which the band where the PCell is located corresponds expires, the flushing or releasing operation performed to the corresponding resources of the band where the PCell is located will not affect the bands where the SCells are located, thereby avoiding the problem of interruption of communication links due to flushing or releasing corresponding resources as a result of advanced expiration of the TAT to which the band where the PCell is located corresponds.

In this implementation, if not all the TATs to which the bands where the SCells are located correspond have expired before, that is, there are still TAT(s) to which the band(s) where the SCell(s) is(are) located corresponds/correspond and which is(are) still in operation when the TAT to which the band where the PCell is located corresponds expires, the terminal may process in a manner of the following step 1006 or 1007.

Step 1006: releasing the HARQ buffer in the band where the PCell is located, releasing the PUCCH and the SRSs corresponding to the carriers in the band where the PCell is located, clearing any configured downlink assignments and uplink grants, and initiating a random access procedure, by the terminal.

In this implementation, if the TAT to which the band where the PCell is located corresponds expires and there are still TAT(s) to which the band(s) where the SCell(s) is(are) located corresponds/correspond and which is(are) in operation, the terminal releases the HARQ buffer in the band where the PCell is located, releases the PUCCH and the SRSs corresponding to the carriers in the band where the PCell is located, and clears any configured downlink assignments and uplink grants. After releasing the above resources, no matter whether there are new uplink/downlink data arriving, the terminal immediately performs an uplink random access procedure, so as to obtain resources again and synchronize with the uplink, and accordingly, the TAT to which the band where the PCell is located corresponds is reset, wherein, the random access procedure may be initiated by the terminal, or may be initiated by the base station. And if it is initiated by the terminal, the terminal initiates the random access procedure to the base station immediately after releasing the above resources. The advantage of this manner is timely reaction. However, as such a random access procedure is contention-based, when the resources are insufficient, delay or access failure is possible to occur. And if the random access procedure is initiated by the base station, the base station may monitor the SRS to which the carriers in the band where the PCell is located correspond. When the SRS is blank, it is deemed that the terminal has released this part of resources and the uplink where the PCell is located is out of synchronization, and the base station transmits a command to the terminal instructing the terminal to perform random access. As the random access in this manner is assignment-based but not contention-based, its advantage is that the rate of success of access is high. However, as the base station is needed to monitor the SRS state, the reaction is relatively less timely.

With the method in step 1006, the terminal obtains resources again and synchronizes with the uplink through a random access procedure, thus avoiding the problem of interruption of communication links due to flushing or releasing corresponding resources as a result of advanced expiration of the TAT to which the band where the PCell is located corresponds.

Step 1007: terminating the TATs to which the bands where the SCells are located correspond, flushing the HARQ buffer in all the bands, releasing the PUCCH and the SRSs corresponding to the carriers in all the bands, clearing any configured downlink assignments and uplink grants.

In this implementation, if the TAT to which the band where the PCell is located corresponds expires and there are still TAT(s) to which the band(s) where the SCell(s) is(are) located corresponds/correspond and which is(are) in operation, the terminal may further terminate the TAT(s) in operation and at the same time, flushes the HARQ buffer in all the bands, releases the PUCCH and the SRSs corresponding to the carriers in all the bands, and clears any configured downlink assignments and uplink grants.

With the method in step 1007, the terminal terminates the TAT(s) to which the bands where the SCell(s) is(are) located corresponds/correspond and which is(are) in operation. In this way, the terminal will not transmit data in the band(s) where the SCell(s) is(are) located, thereby avoiding the problem of affecting the band where the SCells are located due to flushing or releasing corresponding resources as a result of expiration of the TAT to which the band where the PCell is located corresponds.

In another implementation of this embodiment, if the expired TAT is the TAT to which the band where the PCell is located corresponds, the terminal may further execute the following steps:

step 1008: judging whether there is data that arrives; and step 1009: initiating a random access procedure if there is data that arrives.

In this implementation, when the terminal maintains a plurality of TATs, if there is uplink data that arrives, the terminal initiates a random access procedure only it is discovered that the TAT to which the band where the PCell is located corresponds expires, no matter whether other TATs expire, so as to obtain resources and synchronize with the uplink, and reset the TAT at the same time.

In this implementation, although the TAT to which the band where the PCell is located corresponds expires, when there is uplink data that arrives, the terminal may obtain resources again and synchronize with the uplink and make the TAT be reset by initiating the random access procedure via the uplink data, thus avoiding the problem of interruption of communication links due to flushing or releasing corresponding resources as a result of expiration of the TAT to which the band where the PCell is located corresponds.

In this embodiment, when the terminal maintains a plurality of time advance timers, each time advance timer may correspond to all the carriers in a band, or may correspond to a part of the carriers in a band. This embodiment is not limited thereto.

In this embodiment, "band" is a logic concept, and all the carriers may be deemed as being in the same band only if the transmission characteristics of them are identical or the difference between the transmission characteristics of them is less than a certain threshold. That is, each of the bands in this embodiment corresponds to a plurality of carriers, the transmission characteristics of the carriers being identical or the difference between the transmission characteristics of the carriers being less than a predefined threshold.

The steps of the method of this embodiment are described in an order of the serial numbers. However, the order of the execution of the steps is not limited in this embodiment, and may be determined according to the result of judgment.

With the method of this embodiment, the terminal determines a particular processing method according to whether an expired TAT is the TAT to which the band where the PCell is located corresponds, so as to ensure that the TAT to which the band where the PCell is located corresponds expires at last, thereby avoiding occurrence of effect on the bands where the SCells are located and hence interruption of communications due to flushing or releasing corresponding resources as a result of advanced expiration of the TAT to which the band where the PCell is located corresponds, and efficiently solving the problem of maintenance of one or more TATs in a multi-band carrier aggregation wireless system.

An embodiment of the present invention further provides terminal equipment, as described in Embodiment 4 below. As the principle of the terminal equipment for solving problems is similar to that of the method for maintaining a time advance timer based on terminal equipment of Embodiment 3, the implementation of the method may be referred to for the implementation of the terminal equipment, and the repeated parts shall not be described any further.

Embodiment 4

Figure 11:
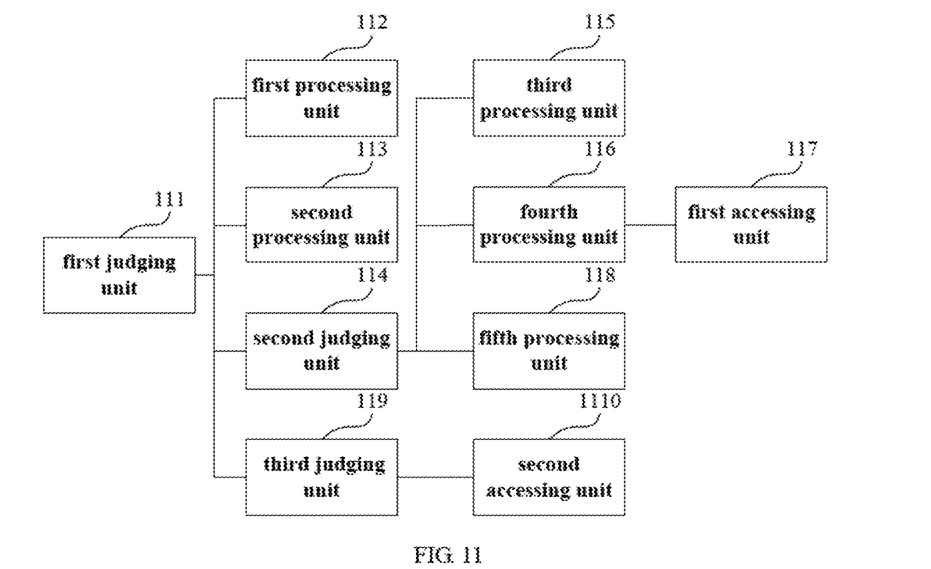
FIG. 11 is a schematic diagram of the composition of the terminal equipment of Embodiment 4 of the present invention.

FIG. 11 is a schematic diagram of the composition of the terminal equipment of Embodiment 4 of the present invention. As shown in FIG. 11, the terminal equipment comprises: a first judging unit 111 and a first processing unit 112; wherein, the first judging unit 111 is configured to judge whether an expired TAT is a TAT to which a band where a primary cell is located corresponds; and the first processing unit 112 is configured to flush all the HARQ buffer in the band to which the expired TAT corresponds and release the specific resources in a PUCCH and SRSs when the result of judgment of the first judging unit 111 is that the expired TAT is not a TAT to which a band where a primary cell is located corresponds, the specific resources corresponding to the carriers in the band to which the expired TAT corresponds, and the SRSs corresponding to the carriers in the band to which the expired TAT corresponds.

In one implementation, the terminal equipment further comprises:
a second processing unit 113 configured to flush the HARQ buffer in all the bands, release the PUCCH and the SRSs corresponding to the carriers in all the bands, and clear any configured downlink assignments and uplink grants when the result of judgment of the first judging unit 111 is that the expired TAT is TAT to which a band where the primary cell is located corresponds and TAT(s) to which the band(s) where all the secondary cell(s) are located corresponds/correspond.

In one implementation, the terminal equipment further comprises:
a second judging unit 114 configured to judge whether the TAT(s) to which the band(s) where the secondary cell(s) is(are) located corresponds/correspond expires/expire when the result of judgment of the first judging unit 111 is that the expired TAT is a TAT to which a band where the primary cell is located corresponds; and
a third processing unit 115 configured to flush the HARQ buffer in the band where the primary cell is located, release the PUCCH and the SRSs corresponding to the carriers in the band where the primary cell is located, and clear any configured downlink assignments and uplink grants when the result of judgment of the second judging unit 114 is that all the TAT(s) to which the band(s) where all the secondary cell(s) is(are) located corresponds/correspond expires/expire before.

In one implementation, wherein the terminal equipment further comprises:
a fourth processing unit 116 configured to flush the HARQ buffer in the band where the primary cell is located, release the PUCCH and the SRSs corresponding to the carriers in the band where the primary cell is located, clear any configured downlink assignments and uplink grants when the result of judgment of the second judging unit 114 is that there is(are) TAT(s) to which the band(s) where the secondary cell(s) is(are) located corresponds/correspond is(are) in operation; and
a first accessing unit 117 configured to initiate a random access procedure after the processing performed by the fourth processing unit 116 is finished.

In one implementation, the terminal equipment further comprises:
a fifth processing unit 118 configured to terminate the TAT(s) to which the band(s) where the secondary cell(s) is(are) located corresponds/correspond when the result of judgment of the second judging unit 114 is that the TAT(s) to which the band(s) where the secondary cell(s) is(are) located corresponds/correspond is(are) in operation.

In one implementation, the terminal equipment further comprises:
a third judging unit 119 configured to judge whether there is uplink data arrived when the result of judgment of the first judging unit 111 is that the expired TAT is the TAT to which the band where the primary cell is located corresponds; and
a second accessing unit 1110 configured to initiate a random access procedure when the result of judgment of the third judging unit 119 is that there is uplink data arrived.

The terminal equipment of this embodiment determines a particular processing method according to whether an expired TAT is the TAT to which the band where the PCell is located corresponds, so as to ensure that the TAT to which the band where the PCell is located corresponds expires at last, thereby avoiding occurrence of effect on the band(s)

where the SCell(s) is(are) located and hence interruption of communications due to flushing or releasing corresponding resources as a result of advanced expiration of the TAT to which the band where the PCell is located corresponds, and efficiently solving the problem of maintenance of one or more TATs in a multi-band carrier aggregation wireless system.

Figure 12:
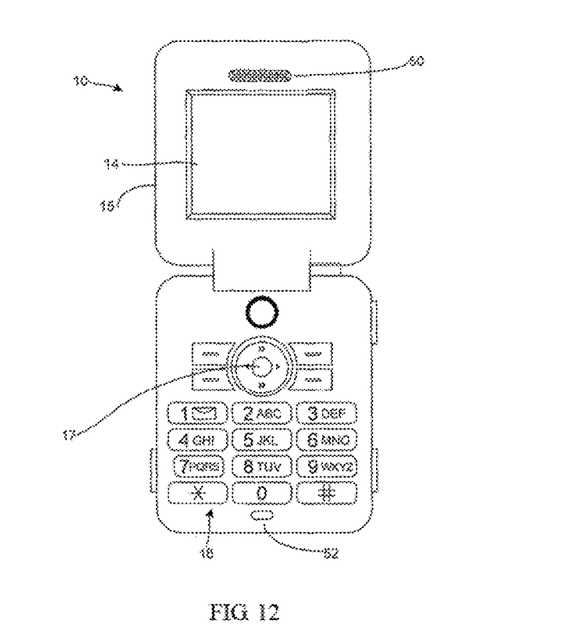
FIG. 12 is a schematic diagram of the mobile phone used as an example of the terminal equipment of an embodiment of the present invention.

FIG. 12 is a schematic diagram of the mobile phone used as an example of the terminal equipment of an embodiment of the present invention. Examples of the terminal equipment are not limited to a mobile phone. And the terminal equipment may also be any devices capable of communicating, such as a game player, a PDA, and a portable computer, etc. As shown in FIG. 12, the mobile phone 10 may be a flip-lid phone having a flip lid 15 movable between an open position and a closed position. In FIG. 12, the flip lid 15 is shown as being in the open position. It should understood that the mobile phone 10 may also be of other structures, such as a "bar phone" or a "slide-lip phone" structure.

The mobile phone 10 may comprise a display 14. The display 14 displays such information to a user as an operational state, time, phone number, telephone directory information, and various menus, etc., so that the user is enabled to use various characteristics of the mobile phone 10. The display 14 may also be used to visibly display contents received by the mobile phone 10 and/or retrieved from a memory (not shown) of the mobile phone 10. The display 14 may be used to display images, videos and other graphics to a user, such as photos, mobile TV contents and videos related to games, etc.

A keyboard 18 provides multiple user input operations. For example, the keyboard 18 may comprise an alphanumeric key permitting input of alphanumeric information (such as a phone number, a phone list, telephone directory information, a notebook, and a text, etc.). Furthermore, the keyboard 18 may comprise specific functional keys 17, such as a "call transmit" key to initiate a call or respond a call, and a "call end" key to end or "hang up" a call. The specific functional keys may further comprise a menu navigation key and a selection key on the menu of the display 14 for convenient navigation. For example, a pointing device and/or a navigation key may be provided to receive directional input from a user. Furthermore, the display 14 and the keyboard 18 may be combined in use for carrying out a function of a soft key. The mobile phone 10 may further comprise parts necessary for carrying out its functions, such as an antenna, a microcontroller, a loudspeaker 50, and a microphone 52, etc.

An embodiment of the present invention further provides a computer-readable program, wherein when the program is executed in a base station, the program enables the computer to carry out the method for maintaining a time advance timer as described in Embodiment 1 in the base station.

An embodiment of the present invention further provides a storage medium in which a computer-readable program is stored, wherein the computer-readable program enables the computer to carry out the method for maintaining a time advance timer as described in Embodiment 1 in a base station.

An embodiment of the present invention further provides a computer-readable program, wherein when the program is executed in terminal equipment, the program enables the computer to carry out the method for maintaining a time advance timer as described in Embodiment 3 in the terminal equipment.

An embodiment of the present invention further provides a storage medium in which a computer-readable program is stored, wherein the computer-readable program enables the computer to carry out the method for maintaining a time advance timer as described in Embodiment 3 in terminal equipment.

The above devices and methods of the present invention may be implemented by hardware, and may also be implemented by hardware in combination with software. The present invention relates to such a computer-readable program that when the program is executed by a logic part, it enables the logic part to realize the above-described devices or components, or enables the logic part to realize all the methods and steps as described above. The present invention relates also to a storage medium storing the above program, such as a hard disc, a floppy disc, a compacted disc, a DVD, and a flash memory, etc.

The present invention is described above with reference to particular embodiments; however, it should be understood by those skilled in the art that such description is illustrative only, and is not intended to limit the protection scope of the present invention. Various variants and modifications may be made by those skilled in the art in accordance with the spirits and principle of the present invention, and such variants and modifications also fall within the scope of the present invention.

What is claimed is:

1. A base station comprising:
a memory that stores a plurality of instructions;
a processor coupled to the memory and configured to execute the plurality of instructions to determine whether a band to be uplink adjusted includes only a band corresponding to a primary cell; and
a transmitter configured to transmit a command for the band corresponding to the primary cell when it is determined that the band to be uplink adjusted includes only the band corresponding to the primary cell, wherein, the command contains an indication of the band corresponding to the primary cell, such that a timer relating to uplink synchronization for the band corresponding to the primary cell is restarted.

2. The base station according to claim 1, wherein the transmitter is further configured to transmit a command for the band to be uplink adjusted and the band corresponding to the primary cell when it is determined that the band to be uplink adjusted includes a band not corresponding to the primary cell, such that a timer relating to uplink synchronization associated with the band to be uplink adjusted and the timer relating to uplink synchronization only associated with the band corresponding to the primary cell are restarted.

* * * * *